US 11,364,849 B2

(12) United States Patent
Jinbo

(10) Patent No.: US 11,364,849 B2
(45) Date of Patent: Jun. 21, 2022

(54) ONE-WAY DAMPER MECHANISM

(71) Applicant: NIFCO INC., Yokosuka (JP)

(72) Inventor: Naoto Jinbo, Yokosuka (JP)

(73) Assignee: NIFCO INC., Yokosuka (JP)

( * ) Notice: Subject to any disclaimer, the term of this patent is extended or adjusted under 35 U.S.C. 154(b) by 301 days.

(21) Appl. No.: 16/498,051

(22) PCT Filed: Mar. 30, 2018

(86) PCT No.: PCT/JP2018/013623
§ 371 (c)(1),
(2) Date: Sep. 26, 2019

(87) PCT Pub. No.: WO2018/181905
PCT Pub. Date: Oct. 4, 2018

(65) Prior Publication Data
US 2020/0317138 A1    Oct. 8, 2020

(30) Foreign Application Priority Data

Mar. 31, 2017   (JP) .............................. JP2017-071055

(51) Int. Cl.
*B60R 7/06*       (2006.01)
*F16F 9/12*       (2006.01)
(Continued)

(52) U.S. Cl.
CPC .................. *B60R 7/06* (2013.01); *F16F 9/12* (2013.01); *B60G 2204/128* (2013.01);
(Continued)

(58) Field of Classification Search
CPC .... F16F 9/12; F16F 9/54; F16H 19/04; B60G 2204/128; B60R 7/06; E05B 83/30; E05Y 2201/266; E05Y 2900/538
See application file for complete search history.

(56) References Cited

U.S. PATENT DOCUMENTS 5,690,194 A  *  11/1997  Parker ..................... F16H 19/04
                                                                188/82.1
5,839,548 A  *  11/1998  Parker ..................... F16F 9/12
                                                                188/82.1
(Continued)

FOREIGN PATENT DOCUMENTS

JP           S60-101241 U     7/1985
JP           3356887 B2      10/2002
(Continued)

OTHER PUBLICATIONS

Europe Patent Office, "Search Report for European Patent Application No. 18775645.7," dated Nov. 24, 2020.
(Continued)

*Primary Examiner* — Thomas W Irvin
(74) *Attorney, Agent, or Firm* — Manabu Kanesaka

(57) ABSTRACT

A one-way damper mechanism, which can properly operate a damper by appropriately engaging a gear and a rotary damper so as to reduce wobbling, is provided. A one-way damper mechanism includes a gear-holding member provided with a gear engaging with a rack, which relatively moves to the rack; and a damper-holding member provided with a rotary damper, which relatively moves to the rack, and the one-way damper mechanism changes between a braking state wherein the gear and a damper gear are engaged, and a release state wherein the gear and the damper gear are separated.

11 Claims, 14 Drawing Sheets

(51) Int. Cl.
  *E05B 83/30* (2014.01)
  *F16F 9/54* (2006.01)
  *F16H 19/04* (2006.01)
(52) U.S. Cl.
  CPC .......... *E05B 83/30* (2013.01); *E05Y 2201/21* (2013.01); *E05Y 2201/266* (2013.01); *E05Y 2900/538* (2013.01); *F16F 9/54* (2013.01); *F16H 19/04* (2013.01)

(56) References Cited

U.S. PATENT DOCUMENTS

| | | | | |
|---|---|---|---|---|
| 6,666,306 | B2* | 12/2003 | Gasser | F16F 7/08 16/64 |
| 6,848,759 | B2* | 2/2005 | Doornbos | A47B 88/467 312/319.1 |
| 7,065,829 | B2* | 6/2006 | Okabayashi | B60R 7/06 16/354 |
| 8,079,450 | B2* | 12/2011 | Zeilenga | F16F 9/12 188/290 |
| 8,925,696 | B2* | 1/2015 | Zeilenga | F16F 9/12 188/290 |
| 10,073,406 | B2* | 9/2018 | Sugiyama | F16F 9/12 |
| 2005/0023089 | A1 | 2/2005 | Okabayashi et al. | |
| 2007/0119852 | A1* | 5/2007 | Matsunaga | B60R 7/06 220/200 |
| 2008/0224370 | A1* | 9/2008 | Derr | E05F 5/06 267/195 |
| 2012/0037580 | A1* | 2/2012 | Kim | G07D 11/12 211/71.01 |
| 2014/0001007 | A1* | 1/2014 | Shimozaki | F16F 9/145 192/12 A |
| 2016/0018780 | A1* | 1/2016 | Sugiyama | G03G 21/1633 399/110 |

FOREIGN PATENT DOCUMENTS

| | | |
|---|---|---|
| JP | 2005-048929 A | 2/2005 |
| JP | 5836281 B2 | 12/2015 |

OTHER PUBLICATIONS

PCT/ISA/210, "International Search Report for International Application No. PCT/JP2018/013623," dated Jun. 5, 2018.

\* cited by examiner

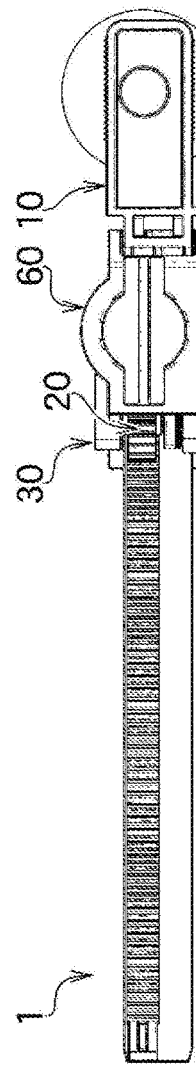
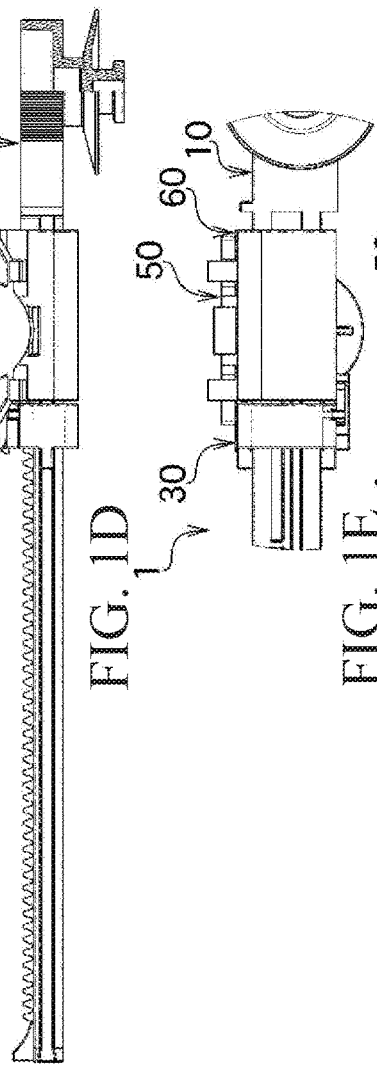
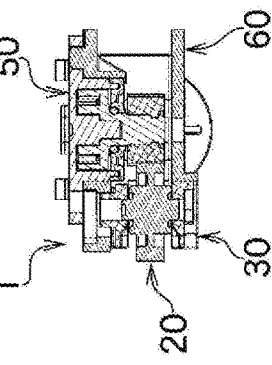
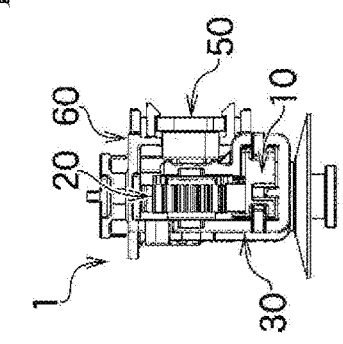

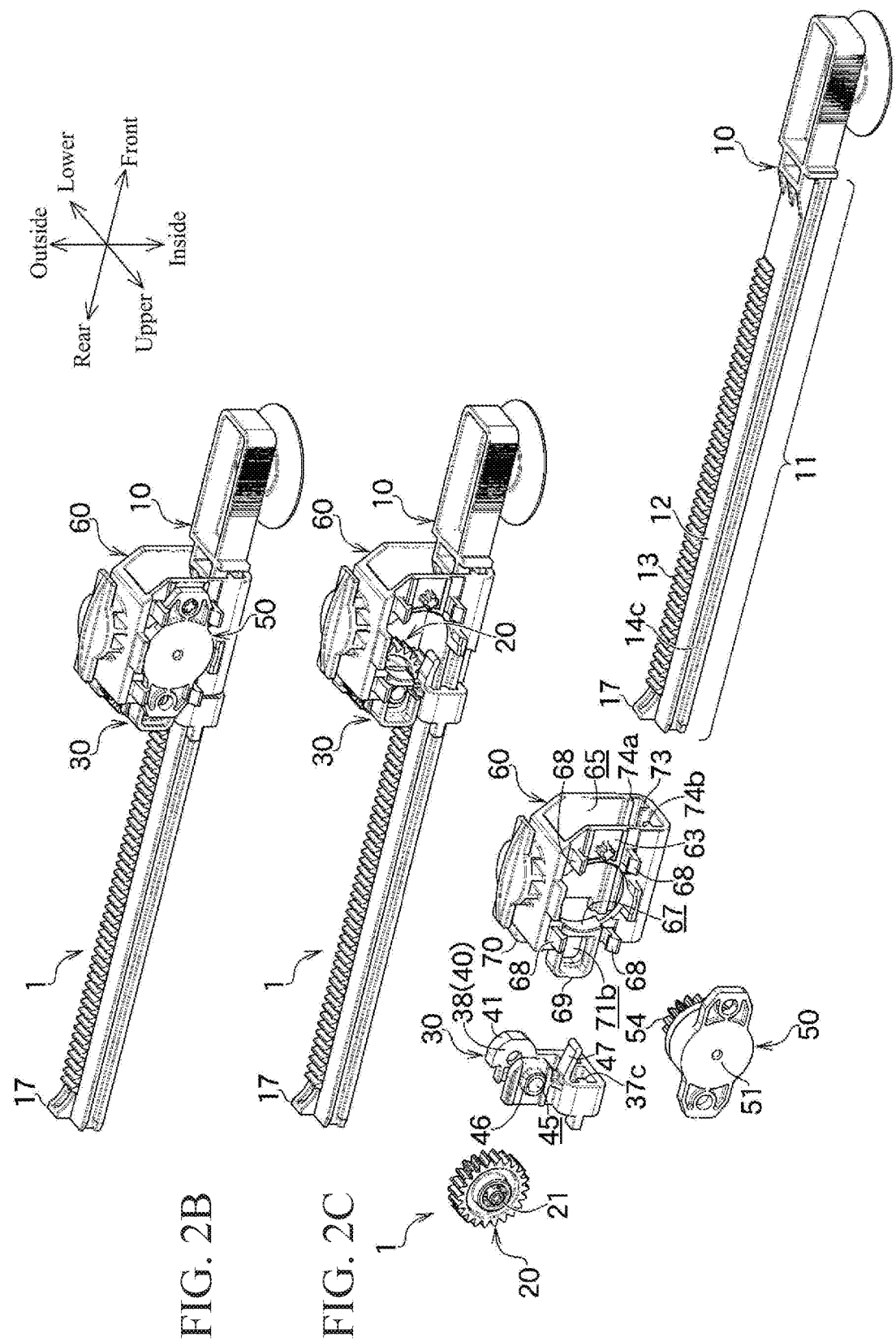

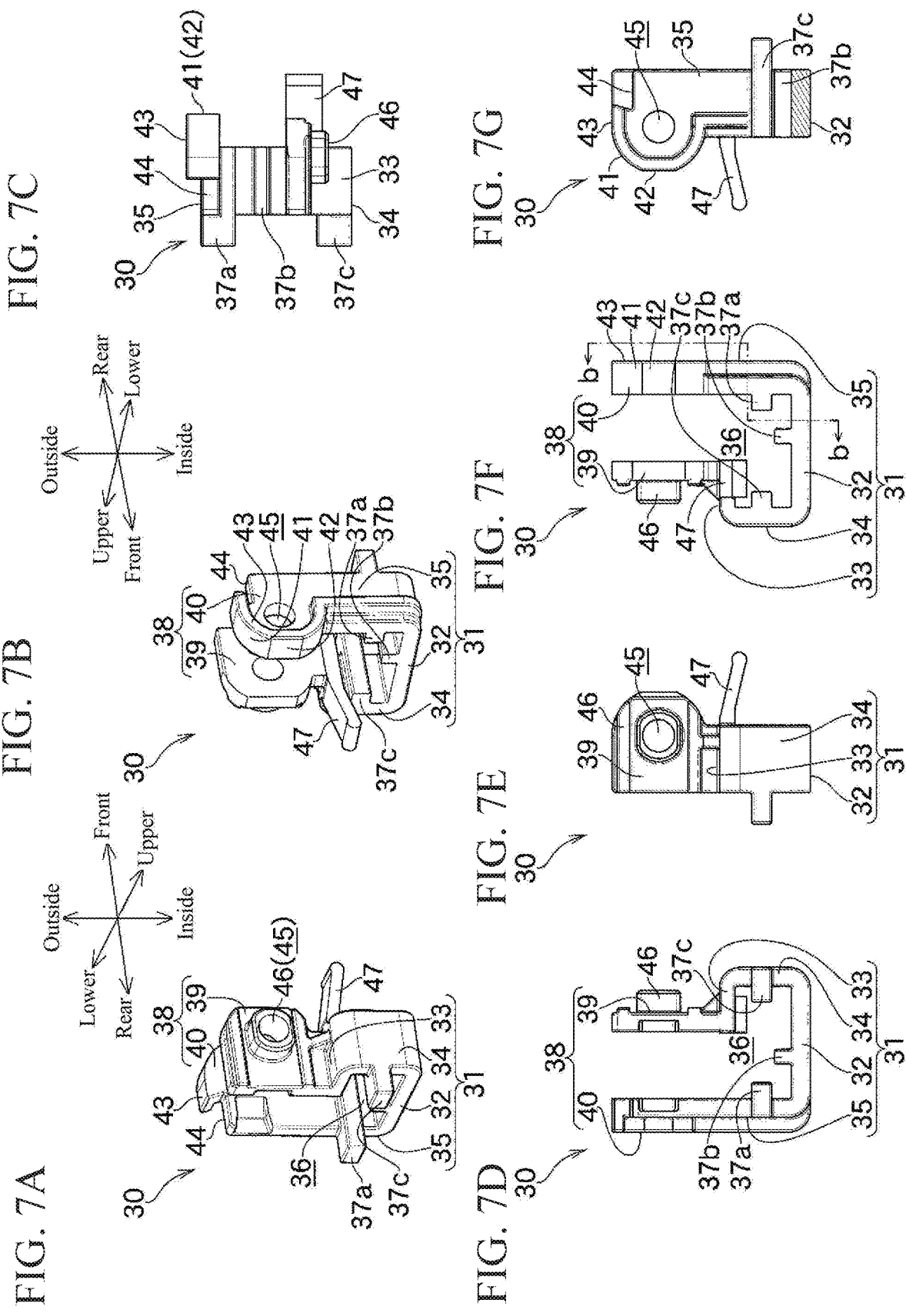

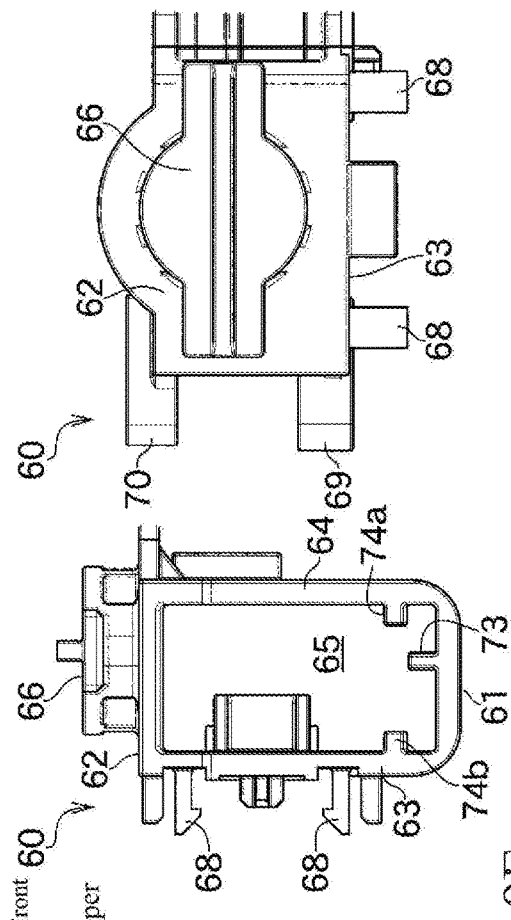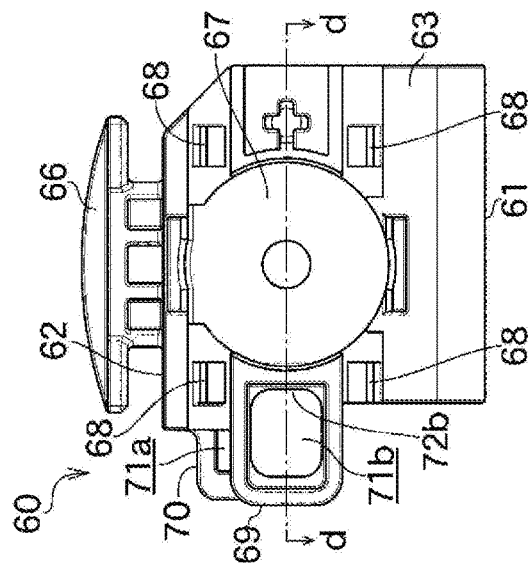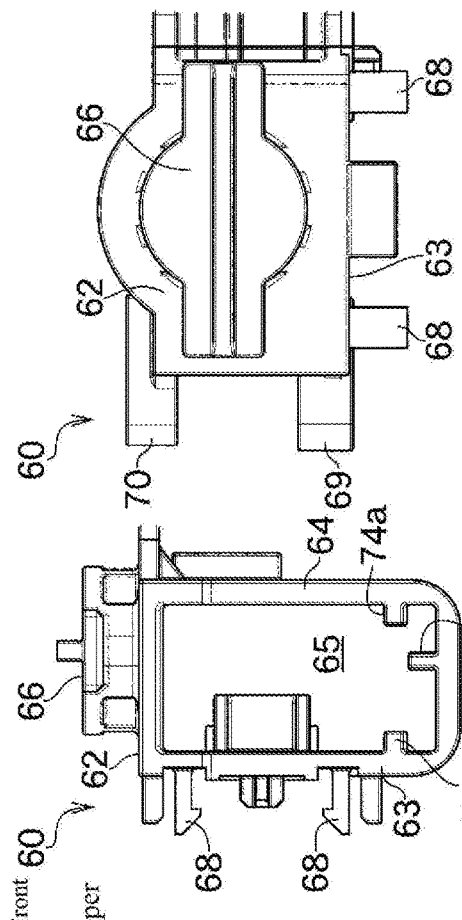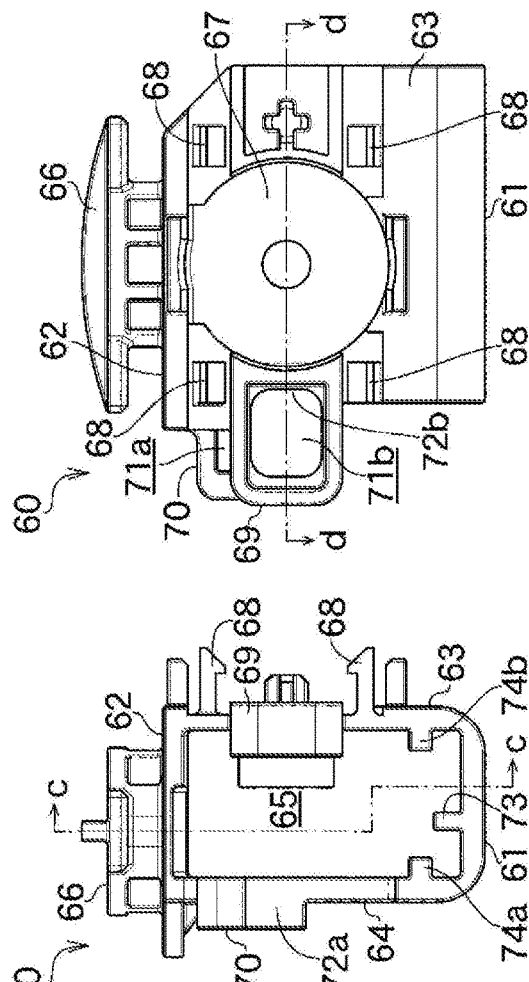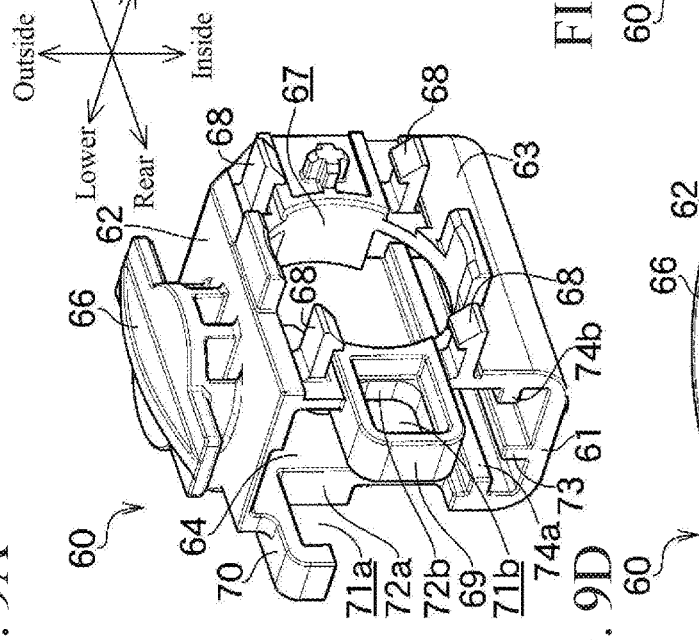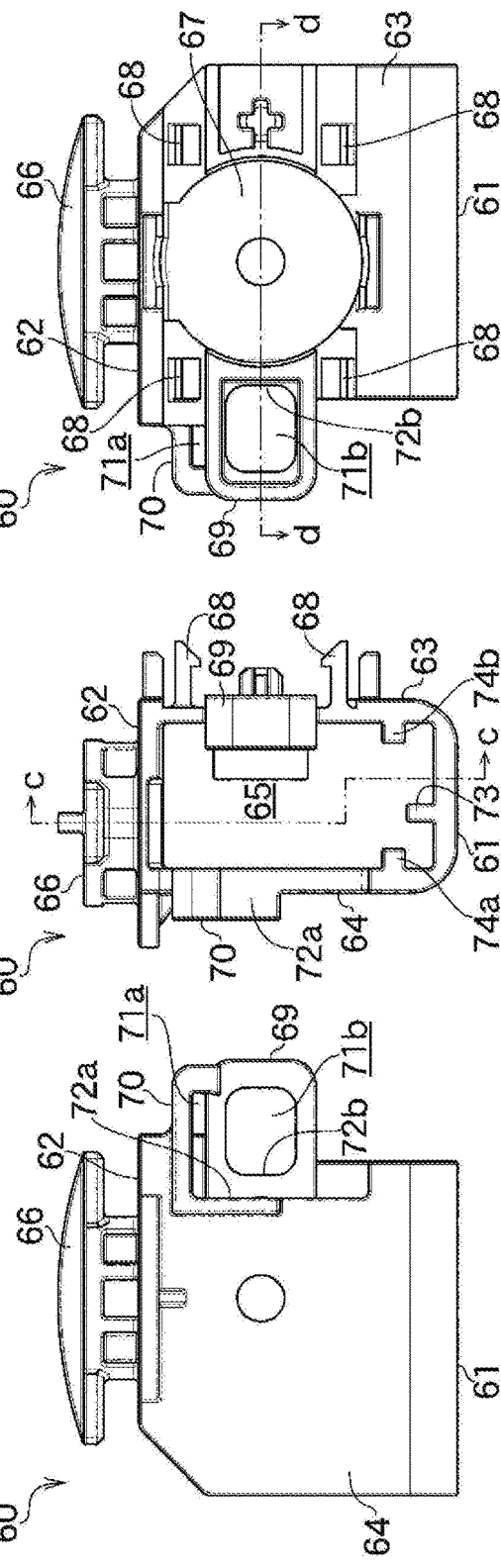

ONE-WAY DAMPER MECHANISM

RELATED APPLICATIONS

The present application is National Phase of International Application No. PCT/JP2018/013623 filed Mar. 30, 2018, and claims priority from Japanese Application No. 2017-071055, filed Mar. 31, 2017, the disclosure of which is hereby incorporated by reference herein in its entirety.

FIELD OF TECHNOLOGY

The present invention relates to a one-way damper mechanism wherein a relative movement to one way is braked, and a relative movement to the other way becomes smooth.

BACKGROUND ART

Conventionally, for example, a glove box of an automobile, and the like have a structure such that when the glove box opens, the glove box slowly opens by its own weight, and when the glove box is closed, the glove box smoothly closes. In order to provide such structure, a one-way damper mechanism is provided in the glove box.

For example, in a damper device described in the following Patent Document 1, a base member and a rack relatively move through a first gear attached to the base member. In the base member, there is formed a long hole, and a shaft of a first gear is disposed in the long hole. Also, in the base member, a second gear is attached together with the damper. In the long hole, the shaft of the first gear moves, so that the damper device changes between a state wherein the first gear and the second gear are engaged and a state wherein the first gear and the second gear are separated.

On the other hand, in a damper mechanism described in the following Patent Document 2, a support member and a rack member relatively move through a rotary damper member attached to the support member. The rotary damper member is formed by incorporating a first part where an engagement portion which is an internal gear is formed with a second part where a pinion portion is provided, and the first part and the second part relatively rotate. In the support member, there is formed a support hole which is a long hole, and there is formed the engagement portion around the support hole. A shaft of the internal gear is disposed in the support hole, and the shaft moves in the support hole, so that the damper mechanism changes between a state wherein the engagement portion of the first part and the engagement portion around the support hole are engaged, and a state wherein the engagement portion of the first part and the engagement portion around the support hole are separated.

Furthermore, in a unidirectional damper mechanism described in the following Patent Document 3, a plate and a rack relatively move through a moving gear attached to the plate. In the plate, there is formed a long hole, and a shaft of the damper is disposed in the long hole. Also, a sliding contact portion is formed in the plate, and the plate is in contact with the rack. The shaft of the damper moves in the long hole, so that the unidirectional damper mechanism changes between a state wherein the damper and the moving gear are engaged, and a state wherein the damper and the moving gear are separated.

PRIOR ART DOCUMENTS

Patent Documents

Patent Document 1: Japanese Patent Application Publication No. 2005-48929

Patent Document 2: Japanese Patent No. 5836281

Patent Document 3: Japanese Patent No. 3356887

SUMMARY OF THE INVENTION

Problems to be Solved by the Invention

According to the aforementioned conventional respective technologies, the gear or the damper (hereinafter, described as "the gear and the like") respectively moves in the long hole of the respective support members so as to change the state. However, when a gap between the shaft of the gear and the like and the long hole is too wide, there is a case wherein the gear and the like become decentered, or a case wherein a wobbling increases. On the other hand, when the gap between the shaft of the gear and the like and the long hole is too narrow, there is a case wherein the gear and the like do not move so as to run idle. Namely, in the conventional respective technologies, since the movement of the gear and the like is unstable, an engagement between the gears, or an engagement between the gear and the damper becomes inappropriate so as to have a case wherein the damper does not operate properly.

The present invention is made in view of the aforementioned conditions. Namely, an object of the present invention is to provide a one-way damper mechanism which can properly operate a damper by appropriately engaging the gear and the rotary damper, thereby reducing the wobbling.

Means for Solving the Problems

In order to obtain the aforementioned object, a one-way damper mechanism according to the present invention comprises a gear-holding member provided with a gear engaging with a rack, and moving relatively to the rack; and a damper-holding member provided with a rotary damper, and moving relatively to the rack, and the one-way damper mechanism changes between a braking state wherein the gear and the rotary damper are engaged, and a release state wherein the gear and the rotary damper are separated.

In the one-way damper mechanism according to the present invention, on one of either the gear-holding member or the damper-holding member, there is provided a locking portion allowing the other of either the gear-holding member or the damper-holding member to follow in the release state.

In the one-way damper mechanism according to the present invention, a sliding resistance portion is provided between one of either the gear-holding member or the damper-holding member and the rack.

In the one-way damper mechanism according to the present invention, the sliding resistance portion is an elastic piece integrally molded with one of either the gear-holding member or the damper-holding member.

In the one-way damper mechanism according to the present invention, the rack inclines to a side engaging with the gear or a side opposite to the side engaging with the gear relative to the gear-holding member or the damper-holding member.

In the one-way damper mechanism according to the present invention, in a contact portion between the gear-holding member and the damper-holding member in the braking state, one of either the gear-holding member or the damper-holding member is formed smaller than the other of either the gear-holding member or the damper-holding member.

In the one-way damper mechanism according to the present invention, the rack is supported by an oscillating member, and one of either the gear-holding member or the damper-holding member is supported by a support member for supporting and housing the oscillating member.

Effect of the Invention

The one-way damper mechanism according to the present invention has the aforementioned structure. Namely, since the damper-holding member is attached to the rack, the rotary damper stably moves along the rack. Likewise, since the gear-holding member is attached to the rack, the gear stably moves along the rack as well. Since the respective holding members move stably, when the release state changes to the braking state, the gear and the rotary damper provided in the respective holding members appropriately engage so as to operate the rotary damper properly, thereby reducing wobbling.

In the one-way damper mechanism according to the present invention, on one of either the gear-holding member or the damper-holding member, there is provided the locking portion allowing the other of either the gear-holding member or the damper-holding member to follow in the release state. Namely, the other of either the gear-holding member or the damper-holding member is locked in the locking portion provided in one of either the gear-holding member or the damper-holding member, so that in the release state, a state wherein the gear-holding member and the damper-holding member are separated at a predetermined interval according to the locking portion is maintained. In other words, in a state wherein the gear and the rotary damper are separated, the other of either the gear or the rotary damper follows one of either the gear or the rotary damper. Therefore, the predetermined interval can be easily provided. Also, in the predetermined interval, the respective holding members move stably, so that when the release state changes to the braking state, the gear and the rotary damper appropriately engage so as to operate the damper properly, thereby reducing the wobbling.

In the one-way damper mechanism according to the present invention, the sliding resistance portion is provided between one of either the gear-holding member or the damper-holding member and the rack. Namely, a frictional force by the sliding resistance portion acts between the gear-holding member or the damper-holding member and the rack, so that one of either the gear-holding member or the damper-holding member is suppressed from moving relative to the rack by its own weight. Therefore, the gear and the rotary damper appropriately engage so as to operate the rotary damper properly.

Incidentally, if, in a case of a structure without the sliding resistance portion, and wherein the gear and the like move in the long hole in a conventional manner, only one of either the gear-holding member or the damper-holding member moves along the rack by its own weight, and is separated from the other of either the gear-holding member or the damper-holding member, so that there is a case wherein the gear and the damper do not engage.

In the one-way damper mechanism according to the present invention, the sliding resistance portion is the elastic piece integrally molded with one of either the gear-holding member or the damper-holding member. Therefore, an increase of number of components is suppressed, and a structure having the sliding resistance portion can be provided.

In the one-way damper mechanism according to the present invention, the rack inclines to the side engaging with the gear or the side opposite to the side engaging with the gear relative to the gear-holding member or the damper-holding member. According to the structure, the rack inclines relative to one of either the gear-holding member or the damper-holding member, so that a size of the one-way damper mechanism changes. Therefore, even in a case wherein there is an error in a size of an object to which the one-way damper mechanism is attached, the one-way damper mechanism can flexibly correspond to various sizes.

In the one-way damper mechanism according to the present invention, in the contact portion between the gear-holding member and the damper-holding member in the braking state, one of either the gear-holding member or the damper-holding member is formed smaller than the other of either the gear-holding member or the damper-holding member. Namely, a contact area in the contact portion is small. According to the structure, in the braking state, and in a state wherein the gear-holding member and the damper-holding member are in contact with each other, when the rack inclines relative to only one of either the gear-holding member or the damper-holding member, the other of either the gear-holding member or the damper-holding member inclines relative to one of either the gear-holding member or the damper-holding member together with the rack as well. In the contact portion, the contact area is small, so that the other of either the gear-holding member or the damper-holding member easily inclines relative to one of either the gear-holding member or the damper-holding member. Therefore, the rack can easily incline relative to one of either the respective holding members. Thereby, the size of the one-way damper mechanism easily changes, and even in a case wherein there is an error in the size of the object to which the one-way damper mechanism is attached, the one-way damper mechanism can flexibly correspond to the various sizes.

Incidentally, if, in a case wherein the contact area in the contact portion is large, when the rack inclines relative to one of either the respective holding members, the other of either the respective holding members is in contact with one of either the respective holding members in a wide range, so that the other of either the respective holding members is difficult to incline relative to one of either the respective holding members, and there is a case wherein the rack is prevented from smoothly inclining.

In the one-way damper mechanism according to the present invention, the rack is supported by the oscillating member, and one of either the gear-holding member or the damper-holding member is supported by the support member for supporting and housing the oscillating member. Namely, the gear-holding member or the damper-holding member moves stably, so that when the oscillating member housed in the support member is pulled out, the gear and the rotary damper provided in the respective holding members engage appropriately so as to operate the rotary damper properly. Thereby, in the braking state, the oscillating member can be braked reliably and pulled out.

BRIEF DESCRIPTION OF THE DRAWINGS

FIGS. 1(A) to 1(E) show an external appearance of a one-way damper mechanism according to an embodiment of the present invention, wherein FIG. 1(A) is an outer surface view; FIG. 1(B) is a rear view; FIG. 1(C) is a top view; FIG. 1(D) is a partial inner surface view; and FIG. 1(E) is a cross-sectional view taken along a-a on an outer surface in FIG. 1(C).

FIGS. 2(A) to 2(C) show an external appearance of the one-way damper mechanism according to the embodiment of the present invention, wherein FIG. 2(A) is an external perspective view in an assembled state; FIG. 2(B) is an external perspective view in a state wherein a rotary damper is removed; and FIG. 2(C) is an exploded perspective view.

FIGS. 3(A) and 3(B) show a state of an operation of the one-way damper mechanism according to the embodiment of the present invention, wherein FIG. 3(A) is a partial bottom view showing a braking state; and FIG. 3(B) is a partial bottom view showing a release state.

FIGS. 4(A) and 4(B) show a schematic drawing of one example in a use state of the one-way damper mechanism according to the embodiment of the present invention, wherein FIG. 4(A) is a schematic top view in the use state in a case wherein an oscillating member opens relative to a support member; and FIG. 4(B) is a schematic top view in the use state in a case wherein the oscillating member is housed in the support member.

FIGS. 5(A) to 5(D) show an external appearance of a rack of the one-way damper mechanism according to the embodiment of the present invention, wherein FIG. 5(A) is a perspective view; FIG. 5(B) is an outer surface view; FIG. 5(C) is a bottom view; and FIG. 5(D) is an inner surface view.

FIGS. 6(A) to 6(C) show an external appearance of a gear of the one-way damper mechanism according to the embodiment of the present invention, wherein FIG. 6(A) is a top view; FIG. 6(B) is an outer surface view; and FIG. 6(C) is a bottom view.

FIGS. 7(A) to 7(G) show an external appearance of a gear-holding member of the one-way damper mechanism according to the embodiment of the present invention, wherein FIGS. 7(A) and 7(B) are perspective views; FIG. 7(C) is an outer surface view; FIG. 7(D) is a rear view; FIG. 7(E) is a top view; FIG. 7(F) is a front view; and FIG. 7(G) is a cross-sectional view taken along b-b on a lower face in FIG. 7(F).

FIGS. 8(A) and 8(B) show an external appearance of a rotary damper of the one-way damper mechanism according to the embodiment of the present invention, wherein FIG. 8(A) is a bottom view; and FIG. 8(B) is a front view.

FIGS. 9(A) to 9(F) show an external appearance of a damper-holding member of the one-way damper mechanism according to the embodiment of the present invention, wherein FIG. 9(A) is a perspective view; FIG. 9(B) is a front view; FIG. 9(C) is an outer surface view; FIG. 9(D) is a bottom view; FIG. 9(E) is a rear view; and FIG. 9(F) is a top view.

FIGS. 10(A) and 10(B) show an external appearance of the damper-holding member of the one-way damper mechanism according to the embodiment of the present invention, wherein FIG. 10(A) is a cross-sectional view taken along c-c on an upper surface in FIG. 9(E); and FIG. 10(B) is a cross-sectional view taken along d-d on an inner surface in FIG. 9(F).

FIGS. 11(A) to 11(C) show a state of the operation of the one-way damper mechanism according to the embodiment of the present invention, wherein FIG. 11(A) is a partial top cross-sectional view showing a state wherein the rack does not incline;

FIG. 11(B) is a partial top cross-sectional view showing a state wherein the rack inclines to an outer side; and FIG. 11(C) is a partial top cross-sectional view showing a state wherein the rack inclines to an inner side.

FIGS. 12(A) and 12(B) show a state of the operation of the one-way damper mechanism according to the embodiment of the present invention, wherein FIG. 12(A) is a partial bottom view showing a contact portion between the gear-holding member and the damper-holding member in the state wherein the rack does not incline; and FIG. 12(B) is a partial bottom view showing the contact portion between the gear-holding member and the damper-holding member in the state wherein the rack inclines to the outer side.

FIGS. 13(A) to 13(C) show an external appearance of the one-way damper mechanism according to a modified example of the embodiment of the present invention, wherein FIG. 13(A) is a perspective view; FIG. 13(B) is a partial exploded perspective view; and FIG. 13(C) is a cross-sectional view taken along e-e on an upper surface in FIG. 13(A).

FIGS. 14(A) and 14(B) show an external appearance of the rotary damper of the one-way damper mechanism according to the modified example of the embodiment of the present invention, wherein FIG. 14(A) is a bottom view; and FIG. 14(B) is a front view.

FIGS. 15(A) and 15(B) show an external appearance of the damper-holding member of the one-way damper mechanism according to the modified example of the embodiment of the present invention, wherein FIG. 15(A) is a front view; and FIG. 15(B) is a top view.

BEST MODES OF CARRYING OUT THE INVENTION

Figure 3A:
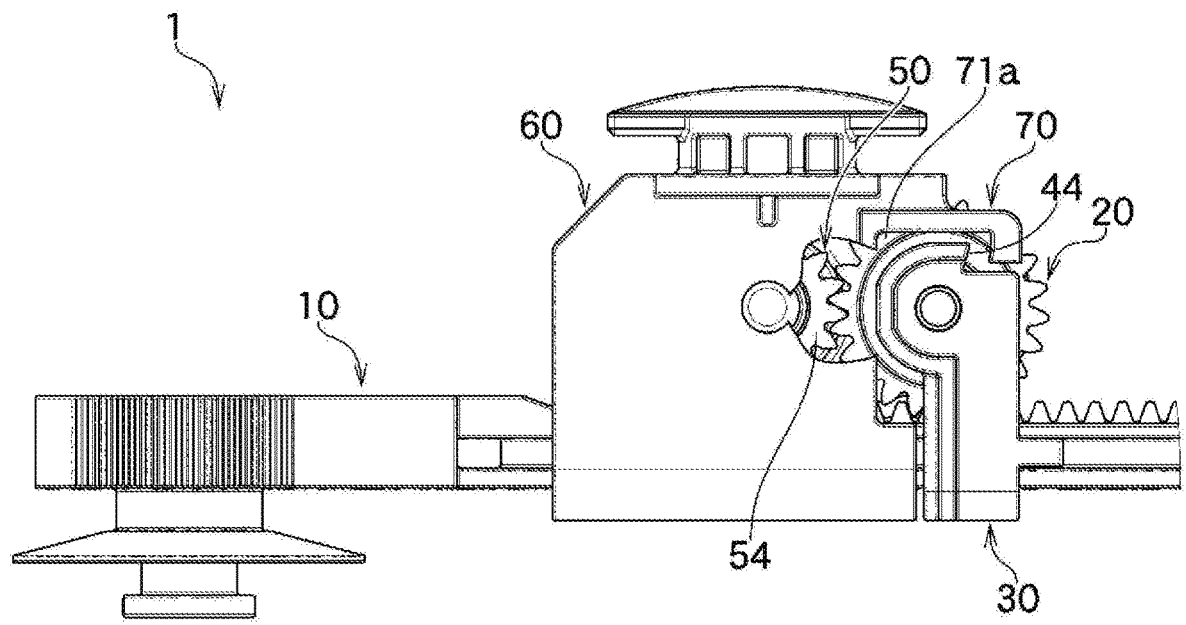
Figure 3B:
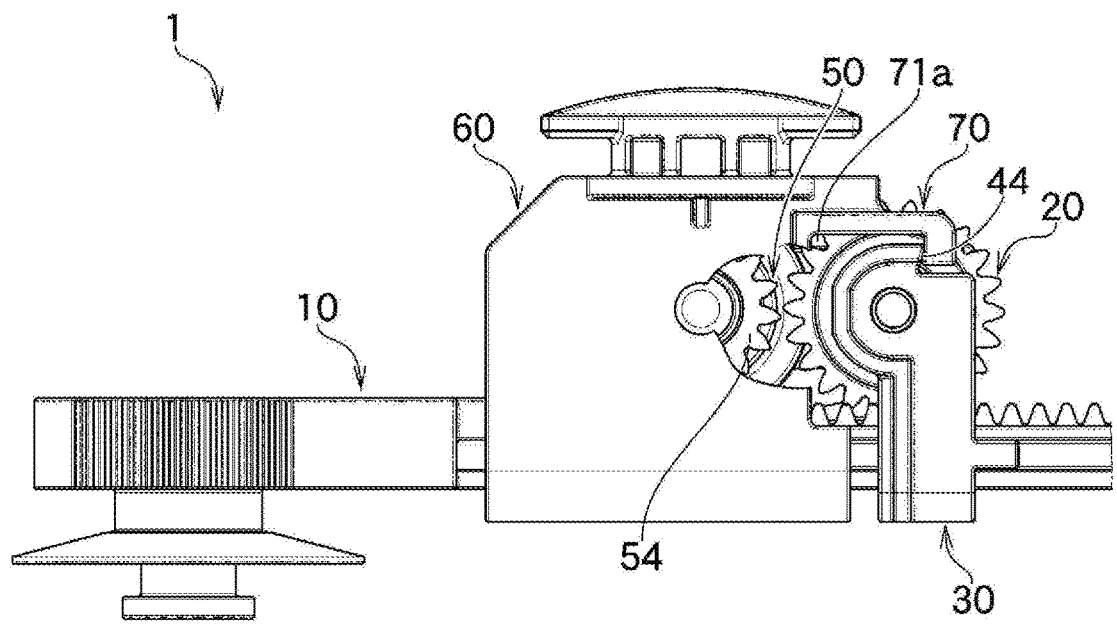
Figure 4A:
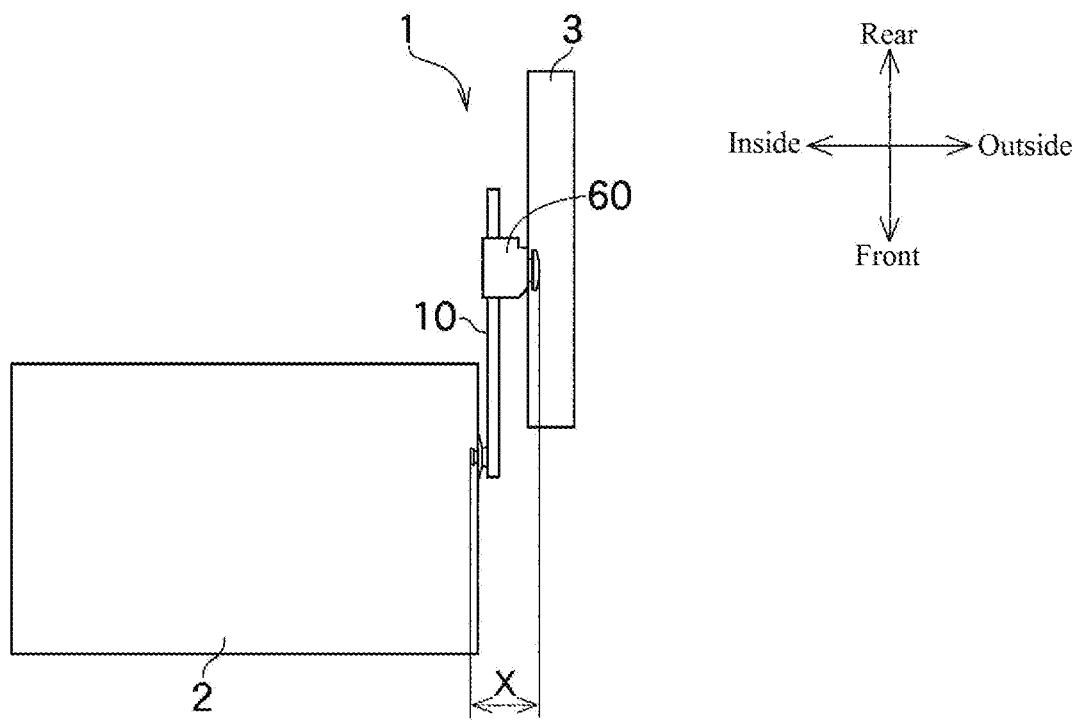
Figure 4B:
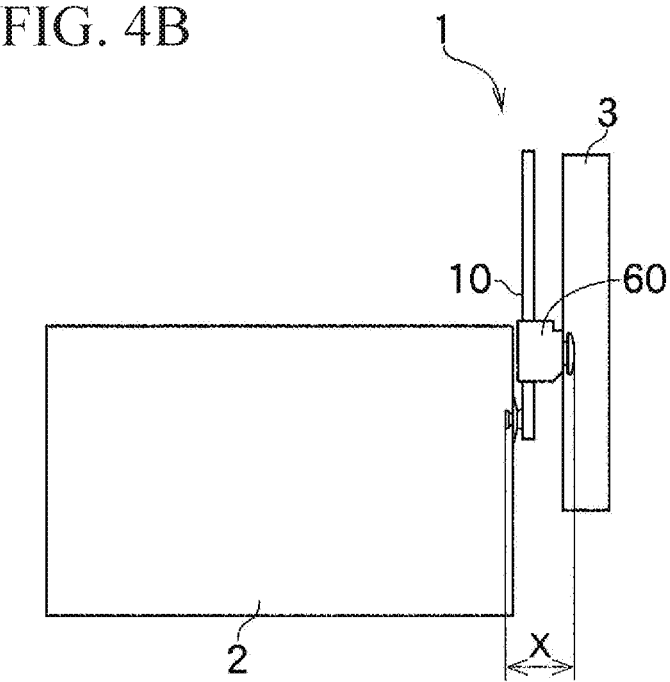
Figure 5A:
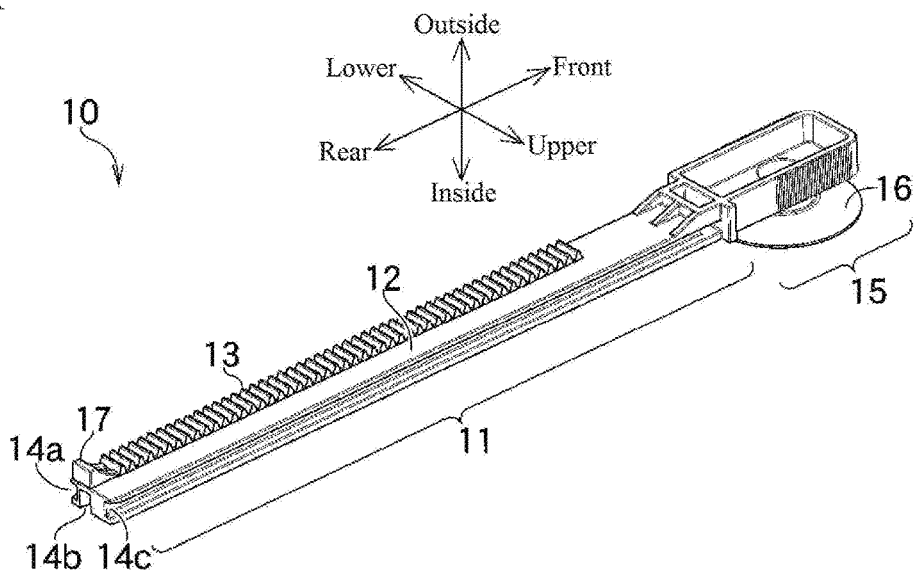
Figure 5B:
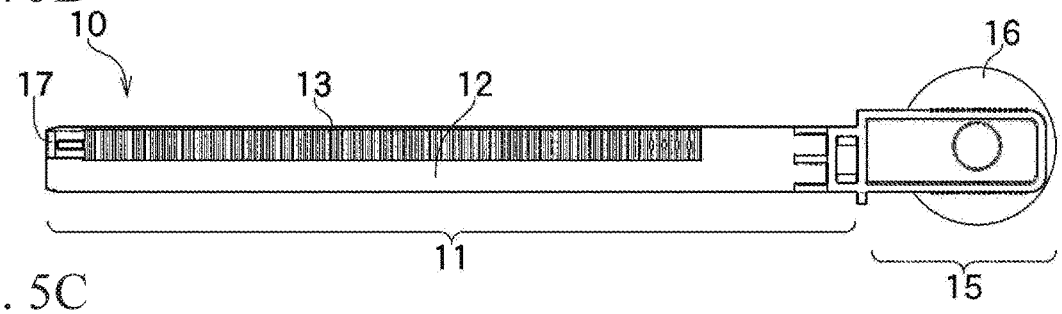
Figure 5C:
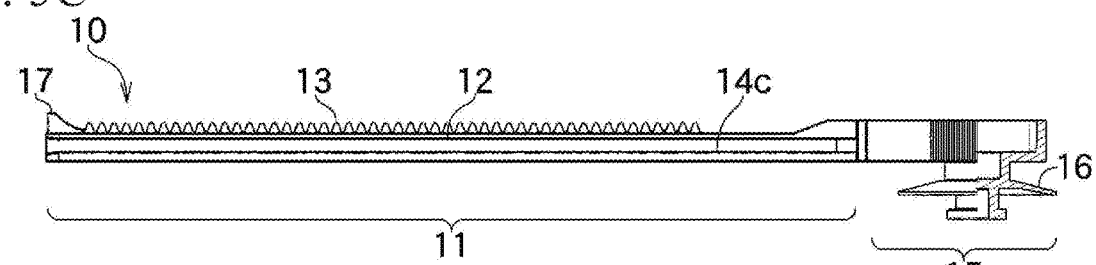
Figure 5D:
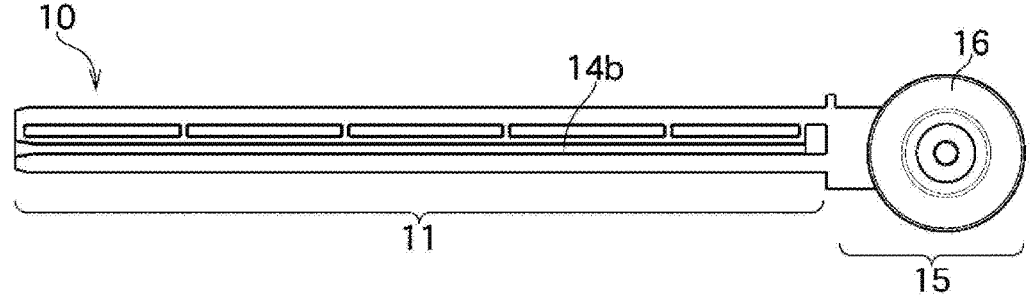

Hereinafter, a one-way damper mechanism according to an embodiment of the present invention will be explained based on the drawings. FIGS. 1(A), 1(B), 1(C), 1(D), and 1(E) and FIGS. 2(A), 2(B), and 2(C) show an external appearance of a one-way damper mechanism 1. FIGS. 3(A) and 3(B) show a state of an operation of the one-way damper mechanism 1. FIGS. 4(A) and 4(B) show a schematic drawing in a state wherein the one-way damper mechanism 1 is attached to a glove box 2 of an automobile (omitted in the drawings).

As shown in FIGS. 1(A), 1(B), 1(C), 1(D), and 1(E) and FIGS. 2(A), 2(B), and 2(C), the one-way damper mechanism 1 according to the present embodiment comprises a long rack 10 wherein teeth are formed; a gear 20 engaged with the rack 10; a gear-holding member 30 comprising the gear 20 and relatively moving to the rack 10; a rotary damper 50 filled with a viscous fluid (omitted in the drawings) and the like; and a damper-holding member 60 comprising the rotary damper 50 and relatively moving to the rack 10. In the one-way damper mechanism 1, the rack 10 and the respective holding members 30 and 60 relatively move, so that as shown in FIGS. 3(A) and 3(B), the one-way damper mechanism 1 changes between a braking state (see FIG. 3(A)) wherein the gear 20 and the rotary damper 50 are engaged, and a release state (see FIG. 3(B)) wherein the gear 20 and the rotary damper 50 are separated.

As shown in FIGS. 4(A) and 4(B), in the one-way damper mechanism 1, for example, in an instrumental panel (omitted in the drawings), the rack 10 is supported by a glove box 2 as an oscillating member, and the damper-holding member 60 is supported by a support member 3 wherein the glove box 2 is supported and housed. The one-way damper mechanism 1 comes to the braking state when the glove box 2 opens (see FIG. 4(A)), and comes to the release state when the glove box 2 is closed (see FIG. 4(B)). Therefore, the glove box 2 opens slowly, and closes smoothly.

Incidentally, in the following explanation, a direction is defined as the standard of a case wherein the one-way damper mechanism 1 is used for the glove box 2. Namely, an opening portion side of the glove box 2 is upward; a bottom portion side of the glove box 2 is downward; a direction where the glove box 2 opens is frontward; a direction where the glove box 2 closes is backward; an inward direction of the glove box 2 is inward; and an outward direction is outward (see FIG. 2(A) and FIG. 4(A)).

Figure 6A:
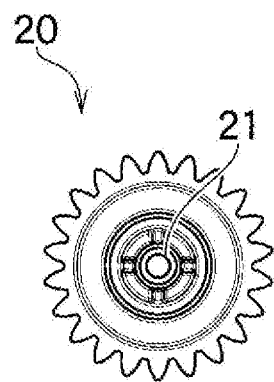
Figure 6B:
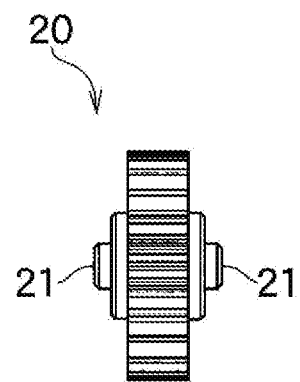
Figure 6C:
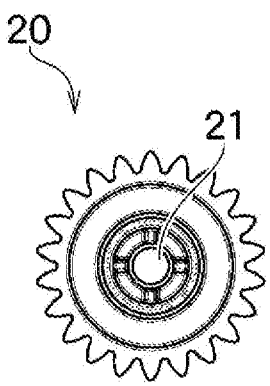
Figure 8A:
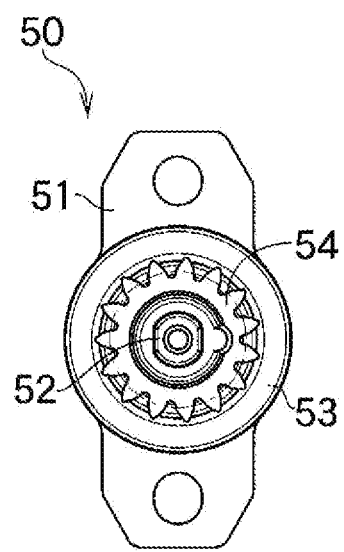
Figure 8B:
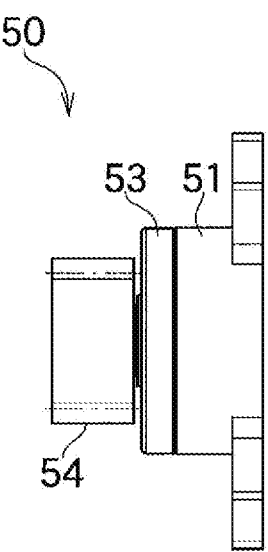
Figure 10A:
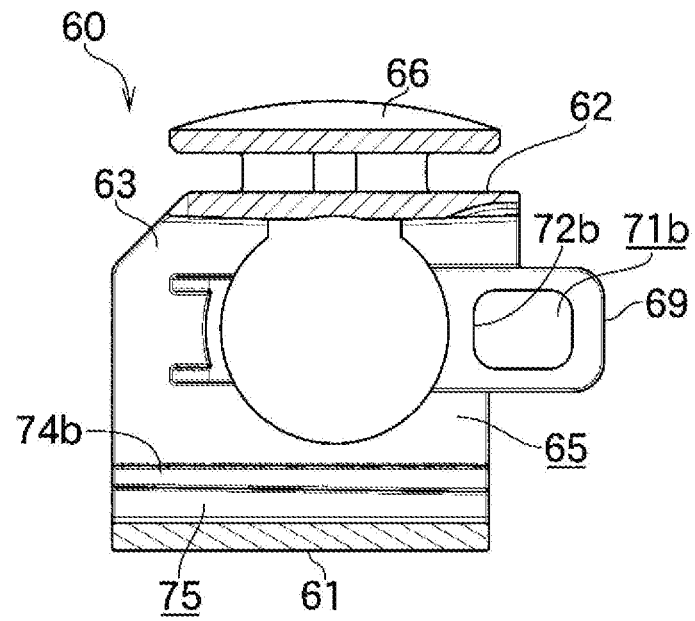
Figure 10B:
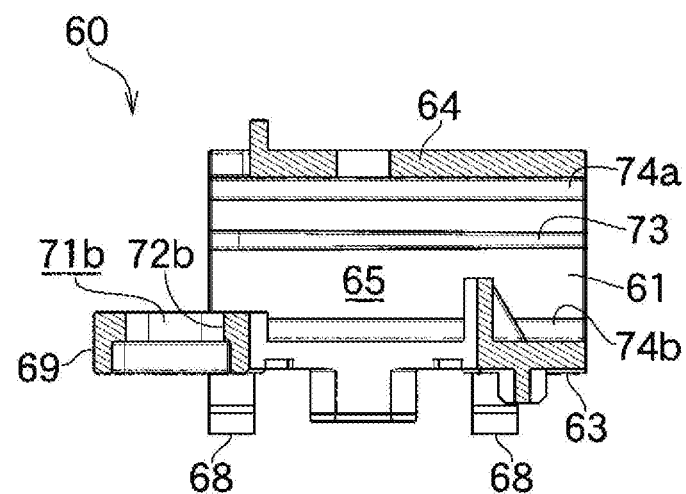

Here, structural members of the one-way damper mechanism 1 will be explained based on the drawings. FIGS. 5(A), 5(B), 5(C), and 5(D) show the rack 10; FIGS. 6(A), 6(B), and 6(C) show the gear 20; FIGS. 7(A), 7(B), 7(C), 7(D), 7(E), 7(F), and 7(G) show the gear-holding member 30; FIGS. 8(A) and 8(B) show the rotary damper 50; and FIGS. 9(A), 9(B), 9(C), 9(D), 9(E), and 9(F), and FIGS. 10(A) and 10(B) show the damper-holding member 60.

As shown in FIGS. 5(A), 5(B), 5(C), and 5(D), the rack 10 has a rod shape long in a front-back direction, and is formed in a flat plate shape. The rack 10 is formed by a rack-main member portion 11 which is a backward side, and a rack-support main member portion 15 which is a frontward side. In the rack-main member portion 11, there is formed a stopper 17 projecting outward from a backward end. Also, the rack-main member portion 11 is divided into two upper and lower stages. The upper stage (the lower side in FIG. 5(B)) is a sliding surface portion 12 formed flatly. On the other hand, the lower stage (the upper side in FIG. 5(B)) is a tooth surface portion 13 wherein teeth are formed. On upper and lower surfaces and an inner surface of the rack-main member portion 11, there are respectively formed rack rail portions 14a, 14b, and 14c which are grooves continuing in the front-back direction. Incidentally, the rack-main member portion 11 may be a so-called angle rack or a round rack provided that the rack-main member portion 11 can form the sliding surface portion 12 or the rack rail portions 14a, 14b, and 14c.

In the rack-support main member portion 15, an oscillating-member support portion 16 approximately having a disk shape is formed inward.

As shown in FIGS. 6(A), 6(B), and 6(C), the gear 20 has a disk shape, and there are formed teeth on a circumferential edge. In the gear 20, there is projected a gear-shaft portion 21 from a center.

As shown in FIGS. 7(A), 7(B), 7(C), 7(D), 7(E), 7(F), and 7(G), the gear-holding member 30 is formed by a gear-holding-member rail portion 31 through which the rack-main member portion 11 passes; a pair of gear-support portions 38 projecting outward from the gear-holding-member rail portion 31, and facing each other; and an elastic piece 47 as a sliding resistance portion projecting frontward from a boundary portion between the gear-holding-member rail portion 31 and the gear-support portion 38, and the respective portions 31, 38, and 47 are integrally molded.

The gear-holding-member rail portion 31 is formed by a gear-holding-member inner surface portion 32; a gear-holding-member outer surface portion 33; a gear-holding-member upper surface portion 34; and a gear-holding-member lower surface portion 35, which are connected to each other in such a way so as to surround an outer surface of the rack-main member portion 11. Specifically explained, an upper end of the gear-holding-member inner surface portion 32 and the gear-holding-member upper surface portion 34 are connected at right angles; the gear-holding-member upper surface portion 34 and the gear-holding-member outer surface portion 33 are connected at right angles; a lower end of the gear-holding-member inner surface portion 32 and the gear-holding-member lower surface portion 35 are connected at right angles; and a gear-holding-member hole portion 36 which is a space surrounded by the respective surface portions 32, 33, 34, and 35 opens in the front-back direction. Since the gear-holding-member outer surface portion 33 is formed shorter than the gear-holding-member inner surface portion 32, there is an opening between the gear-holding-member outer surface portion 33 and the gear-holding-member lower surface portion 35. In the respective surface portions 32, 34, and 35, there are respectively formed gear-holding-member projecting portions 37a, 37b, and 37c toward the gear-holding-member hole portion 36. Also, in the gear-holding-member outer surface portion 33, the elastic piece 47 projects frontward from an end of a frontward side. The elastic piece 47 inclines inward toward a gear-holding-member-hole-portion 36 side.

The gear-support portion 38 is formed by a gear-holding-member upper facing portion 39 and a gear-holding-member lower facing portion 40, and gear-support holes 45 supporting the gear 20 are respectively formed. The gear-holding-member upper facing portion 39 is connected to a lower end of the gear-holding-member outer surface portion 33 at right angles, and a cylindrical shaft-supporting projecting portion 46, which is coaxial with the gear-support hole 45, projects. The gear-holding-member lower facing portion 40 is connected to the gear-holding-member lower surface portion 35 on the same one surface. In the gear-holding-member lower facing portion 40, a gear-holding-member contact portion 41 as a contact portion with the damper-holding member 60 is formed at a front end. The gear-holding-member contact portion 41 curves in an arc shape forward, and a foremost end portion 42, which is a small portion at the front end, is formed flatly. Incidentally, the foremost end portion 42 may be curved. Also, in the gear-holding-member contact portion 41, there is formed a flange portion 43. The flange portion 43 is formed in a peripheral edge over an outward side from the frontward side in the gear-holding-member lower facing portion 40, and projects downwardly. Also, in the gear-holding-member lower facing portion 40, there is formed a notch portion 44 close to a rear side of the outward side.

As shown in FIGS. 8(A) and 8(B), the rotary damper 50 is formed by a case having an approximately cylindrical shape and filled with the viscous fluid; a rotor (omitted in the drawings) formed in a diameter approximately same as that of the case 51 and including a rotor shaft portion 52; a case lid 53 through which the rotor shaft portion 52 passes for covering the case 51; and a damper gear 54 attached to the rotor shaft portion 52. In the case 51, there is housed the rotor, and in a state wherein the rotor shaft portion 52 is exposed to an outside of the case 51, the case 51 is closed by the case lid 53. In the rotor shaft portion 52, there is attached the damper gear 54 on the same shaft as the rotor.

As shown in FIGS. 9(A), 9(B), 9(C), 9(D), 9(E), and 9(F), and FIGS. 10(A) and 10(B), the damper-holding member 60 is formed by a damper-holding-member inner surface portion 61; a damper-holding-member outer surface portion 62; a damper-holding-member upper surface portion 63; and a damper-holding-member lower surface portion 64, and the respective surface portions 61, 62, 63, and 64 are integrally molded, and are formed in a cylinder shape approximately with a square pole. A damper-holding-member hole portion 65, which is a space surrounded by the respective surface portions 61, 62, 63, and 64, opens in the front-back direction. In the damper-holding-member outer surface portion 62, there is formed a support-member support portion 66 on the outward side. In the damper-holding-member upper surface portion 63, there are formed a damper-housing hole 67 where the rotary damper 50 is housed, and damper-engagement pieces 68 formed around the damper-housing hole 67, where the rotary damper 50 engages. Also, in the damper-holding-member upper surface portion 63, a long-hole frame portion 69 projects backward from a back end. In a space surrounded by the locking portion 70 and a back end of the damper-holding-member lower surface portion 64, and a space of the long-hole frame portion 69, there are formed movable areas 71a and 71b where the gear-holding member 30 is housed. In the movable areas 71a and 71b, damper-holding-member contact portions 72a and 72b as the contact portion with the gear-holding member 30 are respectively formed in the back end of the damper-holding-member lower surface portion 64 and a front end of the long-hole frame portion 69.

In the damper-holding-member inner surface portion 61, there is formed a damper-holding-member projecting portion 73 toward the damper-holding-member hole portion 65. Also, in the damper-holding-member upper surface portion 63 and the damper-holding-member lower surface portion 64, there are formed inclined projecting portions 74a and 74b toward the damper-holding-member hole portion 65. In the inclined projecting portions 74a and 74b, a width of a front end thereof is formed narrower than a width of a back end thereof. Namely, the widths of the inclined projecting portions 74a and 74b are formed in such a way so as to become gradually narrow toward the front end from the back end, thereby a width of an inclined groove portion 75, which is a groove between the inclined projecting portions 74a and 74b and the damper-holding-member inner surface portion 61, is formed gradually wide toward the front end from the back end (see FIGS. 10(A) and 10(B)).

Next, assembling procedures of the aforementioned respective members 10, 20, 30, 50, and 60 will be explained.

As shown in FIG. 2(C), the rotary damper 50 is attached to the damper-holding-member upper surface portion 63 of the damper-holding member 60. Specifically explained, the damper gear 54 of the rotary damper 50 is housed in the damper-housing hole 67 of the damper-holding-member upper surface portion 63, and the case 51 of the rotary damper 50 engages the damper-engagement pieces of the damper-holding-member upper surface portion 63. The damper gear 54 is disposed in the damper-holding-member hole portion 65. Incidentally, the damper-holding member 60 and the rotary damper 50 may be integrally molded as well.

Next, the gear-holding member 30 is attached to the damper-holding member 60. Specifically explained, the shaft-supporting projecting portion 46 of the gear-holding member 30 is attached to the long-hole frame portion 69 of the damper-holding member 60, and the gear-holding-member contact portion 41 of the gear-holding member 30 is attached to the locking portion 70 of the damper-holding member 60. Thus, the gear-holding member 30 is disposed in the movable areas 71a and 71b of the damper-holding member 60.

Next, the rack 10 passes through the gear-holding member 30 and the damper-holding member 60. Specifically explained, the rack-main member portion 11 passes through the damper-holding-member hole portion 65 of the damper-holding member 60 and a gear-holding-member hole portion 36 of the gear-holding member 30, respectively. The damper-holding-member projecting portion 73 of the damper-holding-member hole portion 65, the inclined projecting portions 74a and 74b, and the gear-holding-member projecting portions 37a, 37b, and 37c in the gear-holding-member hole portion 36 are respectively disposed in the rack rail portions 14a, 14b, and 14c. The elastic piece 47 of the gear-holding member 30 is pressed against the sliding surface portion of the rack-main member portion 11. Incidentally, since a diameter of the damper gear 54 is small compared to that of the gear 20, when the rack 10 passes through the damper-holding member 60, the damper gear 54 does not interfere with the stopper of the rack-main member portion 11, and the damper gear 54 does not engage the tooth surface portion 13 of the rack-main member portion 11.

Next, the gear 20 is attached to the gear-support portions of the gear-holding member 30. Specifically explained, the gear 20 is disposed between the gear-support portions 38 from a backward side, and the gear-shaft portion 21 of the gear 20 is attached to the gear-support holes 45 of the gear-support portions 38. The gear 20 engages the tooth surface portion 13 of the rack-main member portion 11.

Figure 11A:
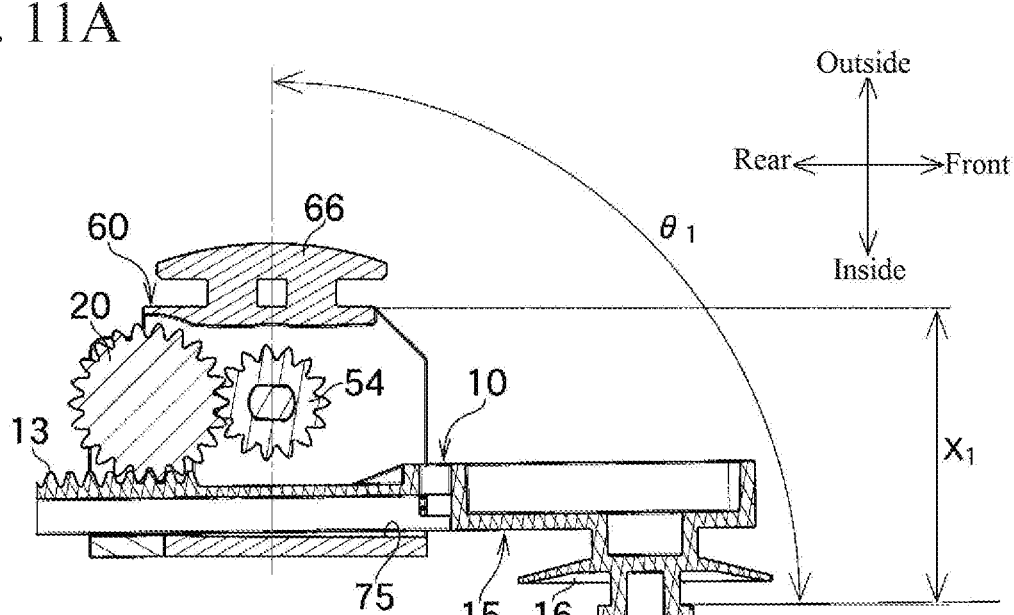
Figure 11B:
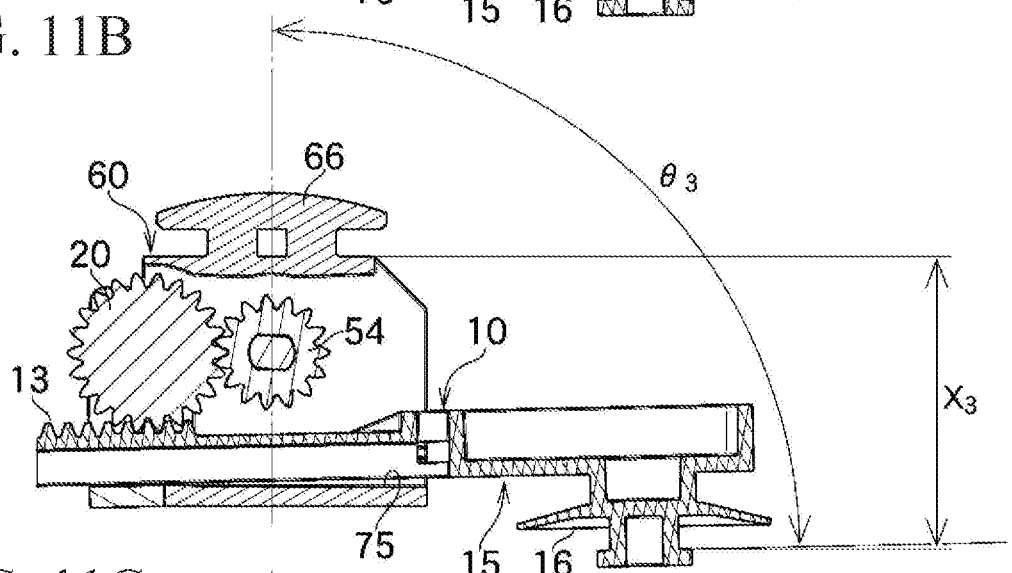
Figure 11C:
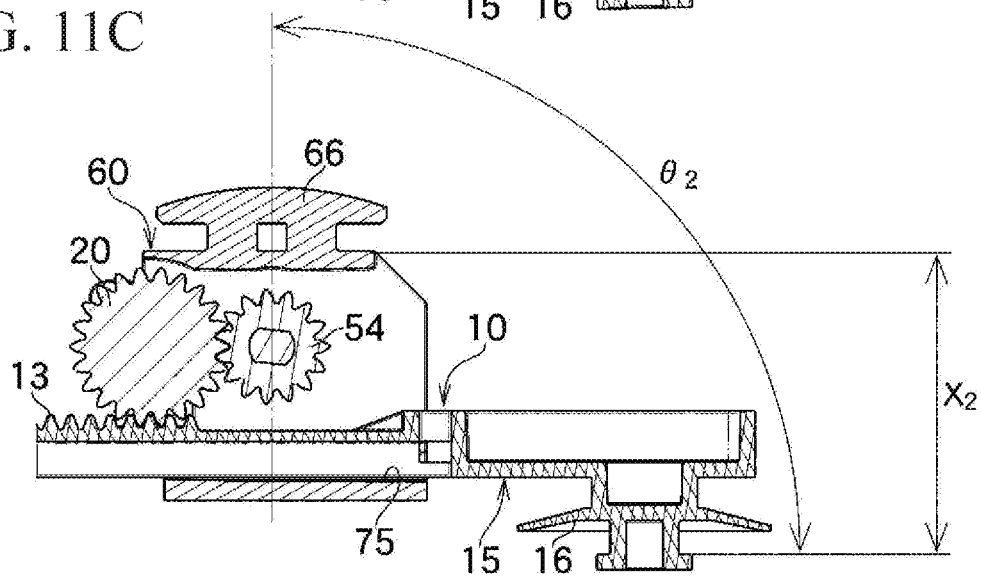
Figure 12A:
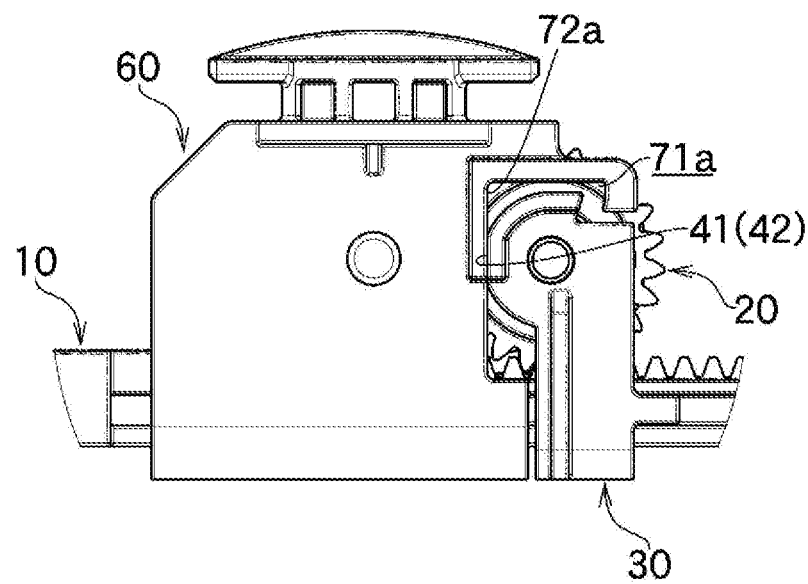
Figure 12B:
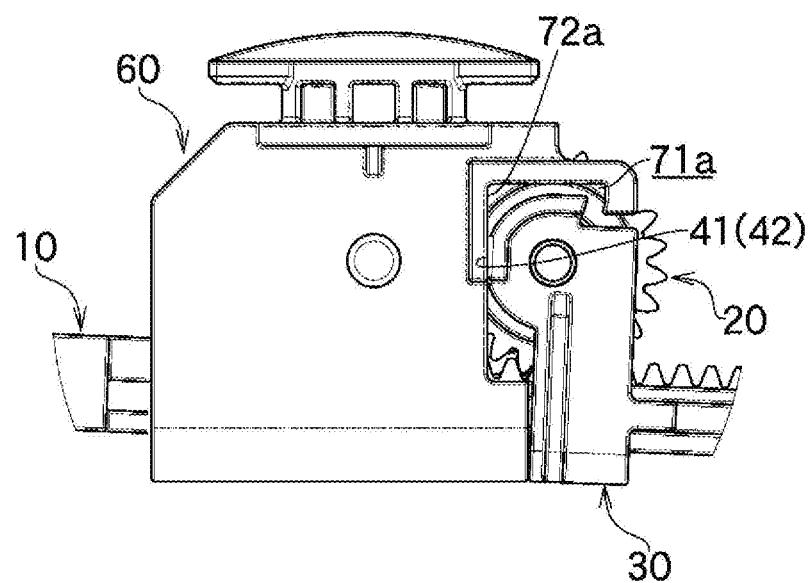

An operating state of the respective members 10, 30, and in the one-way damper mechanism 1 assembled in the aforementioned manner will be explained based on FIGS. 3(A) and 3(B), FIGS. 11(A), 11(B), and 11(C), and FIGS. 12(A) and 12(B) as follows. FIGS. 11(A), 11(B), and 11(C) show a state wherein the rack 10 inclines relative to the damper-holding member 60 in the braking state, and FIGS. 12(A) and 12(B) show the contact portion between the gear-holding member 30 and the damper-holding member 60 in the braking state.

As shown in FIGS. 3(A) and 3(B), the respective holding members 30 and 60, and the rack 10 can move relatively in the front-back direction. In the braking state, the gear 20 and the damper gear 54 engage, so that the rotary damper 50 operates (see FIG. 3(A)). On the other hand, in the release state, the gear-holding member 30 is locked in the locking portion 70 of the notch portion 44, so that in the movable areas 71a and 71b of the damper-holding member 60, the gear-holding member 30 moves by following the damper-holding member 60 so as to control a movable range (see FIG. 3(B))

Here, as shown in FIGS. 11(A), 11(B), and 11(C), the rack 10 has a structure of inclining to the outward side which is a side wherein the tooth surface portion 13 is engaged with the gear 20, and inclining to an inward side which is a side opposite to the side wherein the tooth surface portion 13 is engaged with the gear 20, relative to the damper-holding member 60. Specifically explained, since the width of the inclined groove portion 75 of the damper-holding member 60 is formed gradually wide toward the front end from the back end, the rack 10 inclines at a support point on a back end side where the width is narrow in the inclined groove portion 75. On the basis of a position of the rack 10 shown in FIG. 11(A), in the rack 10, as shown in FIG. 11(B), the rack-support main member portion 15 inclines toward the outward side relative to the damper-holding member 60, and as shown in FIG. 11(C), the rack-support main member portion 15 inclines toward the inward side relative to the damper-holding member 60. An angle of the rack 10 relative to the damper-holding member 60 becomes $\theta_2 > \theta_1 > \theta_3$, and a pitch X between the oscillating-member support portion 16 and the support-member support portion 66 becomes $X_2 > X_1 > X_3$. Therefore, the one-way damper mechanism 1 changes according to a size between the glove box 2 and the support member 3, or an error of respective attachment holes within a range wherein sizes in the inward and outward sides are between $X_2$ and $X_3$ (see FIGS. 4(A) and 4(B)).

Thus, the rack 10 inclines relative to the damper-holding member 60, so that the gear-holding member 30 inclines together with the rack 10 relative to the damper-holding member 60 as well. Since the gear-holding member 30 is stably attached relative to the rack 10, when the rack 10 inclines, the gear-holding member 30 and the damper-holding member 60 interfere in the respective gear-holding-member contact portion 41 and the damper-holding-member contact portions 72a and 72b, however, since a contact area is small, a degree of interferences is low.

Specifically explained, as shown in FIGS. 12(A) and 12(B), in the contact portion between the gear-holding member 30 and the damper-holding member 60 in the braking state, the gear-holding member 30 is formed smaller than the damper-holding member 60. Namely, while the damper-holding-member contact portion 72a of the damper-holding member 60 is flat, the gear-holding-member contact portion 41 of the gear-holding member 30 curves in the arc shape, so that an area of the foremost end portion 42 is formed smaller than that of the damper-holding-member contact portion 72a. In the movable area 71a, since the contact area is small, the gear-holding member 30 smoothly inclines relative to the damper-holding member 60 (see FIG. 12(B)). Furthermore, since the damper gear 54 and the gear 20 are disposed in a position approximately the same as that of the respective contact portions 41 and 72a (see FIGS. 3(A) and 3(B)), when the gear-holding member 30 inclines relative to the damper-holding member 60, a state wherein both respective gears 54 and 20 engage is maintained. Incidentally, while the damper-holding-member contact portion 72b is flat (see FIGS. 9(A) and 9(D)), the shaft-supporting projecting portion 46 of the gear-holding member 30 is cylindrical (see FIGS. 7(A), 7(C), 7(D), and 7(F)), so that the contact area is small in the movable area 71b as well.

Next, effects of the one-way damper mechanism 1 will be explained.

As described above, the one-way damper mechanism 1 comprises the gear 20 engaged with the rack 10 in the gear-holding member 30 which relatively moves to the rack 10; and the damper-holding member 60 wherein the rotary damper 50 is provided, which relatively moves to the rack 10. Namely, since the respective holding members 30 and 60 move stably along the rack 10, when the one-way damper mechanism 1 changes from the release state to the braking state, the gear 20 provided in the respective holding members 30 and 60, and the damper gear 54 of the rotary damper 50 appropriately engage so as to operate the rotary damper 50 properly, thereby reducing wobbling.

According to the one-way damper mechanism 1, in the damper-holding member 60, the locking portion 70 projects from a side close to the damper-holding-member outer surface portion 62 in the back end of the damper-holding-member lower surface portion 64. The locking portion 70 extends backward, and a tip bends toward the inward side at a right angle to form a hook shape. Namely, the notch portion 44 of the gear-holding member is locked in the locking portion 70, so that in the release state, a state wherein the gear-holding member 30 and the damper-holding member 60 are separated at a predetermined interval in the movable area 71a formed by the locking portion 70 is maintained. In other words, in a state wherein the gear 20 and the damper gear 54 are separated, the gear-holding member 30 follows the damper-holding member 60. Therefore, the predetermined interval can be easily formed between the gear 20 and the damper gear 54.

According to the one-way damper mechanism 1, in the gear-holding member 30, the elastic piece 47 projects frontward from a border portion between the gear-holding-member rail portion 31 and the gear-support portion 38, and the elastic piece 47 inclines inward toward the gear-holding-member-hole-portion 36 side. The elastic piece 47 is pressed against the sliding surface portion 12 of the rack-main member portion 11. Namely, the elastic piece 47 is pressed against the rack 10 so as to suppress the gear-holding member 30 from moving relative to the rack 10 by its own weight. Therefore, the gear 20 and the damper gear 54 appropriately engage so as to operate the rotary damper 50 properly.

According to the one-way damper mechanism 1, in the gear-holding member 30, the gear-holding-member rail portion 31, the gear-support portion 38, and the elastic piece 47 are integrally molded. Therefore, an increase of number of the components is suppressed, and a structure including the elastic piece 47 can be provided.

According to the one-way damper mechanism 1, the width of the inclined groove portion 75 of the damper-holding member 60 is formed gradually wider toward the front end from the back end so as to have a structure such that the rack 10 inclines outward or inward relative to the damper-holding member 60. According to the structure, a size of the one-way damper mechanism 1 in the inward-outward side changes. Therefore, even in a case wherein there is an error in the size between the glove box 2 and the support member 3, or in the respective attachment holes, the one-way damper mechanism 1 can flexibly correspond to various sizes.

In the one-way damper mechanism 1, in the contact portion between the gear-holding member 30 and the damper-holding member in the braking state, the gear-holding member 30 is formed smaller than the damper-holding member 60. Namely, while the damper-holding-member contact portion 72a of the damper-holding member 30 is flat, the gear-holding-member contact portion 41 of the gear-holding member 30 curves in the arc shape, so that the area of the foremost end portion 42 is formed smaller than that of the damper-holding-member contact portion 72a. In the movable area 71a, since the contact area is small, the gear-holding member 30 smoothly inclines relative to the damper-holding member 60. Therefore, the size of the one-way damper mechanism 1 in the inward side and the outward side easily changes, and even in the case wherein there is the error in the size between the glove box 2 and the support member 3, or in the respective attachment holes, the one-way damper mechanism 1 can flexibly correspond to the various sizes. Also, since the damper gear 54 and the gear 20 are disposed in the position approximately the same as that of the respective contact portions 41 and 72a, even in a case wherein the gear-holding member 30 inclines relative to the damper-holding member 60, a state wherein respective gears 54 and 20 engage reliably can be maintained.

In the one-way damper mechanism 1, the rack 10 is supported by the glove box 2, and the damper-holding member 60 is supported by the support member 3. According to the structure, when the glove box 2 housed in the support member 3 is pulled out, the gear 20 and the damper gear 54 provided in the respective holding members 30 and 60 engage appropriately so as to operate the rotary damper 50 properly. Thereby, the glove box 2 is reliably braked in the braking state so as to be pulled out.

In the one-way damper mechanism 1, the stopper 17 is formed at the backward end of the rack-main member portion 11. Therefore, the rack 10 can be prevented from slipping out of the gear-holding member 30 and the damper-holding member 60. For example, at a time of maintenance of an air conditioner filter (omitted in the drawings) disposed at a back of the support member 3, in a case wherein the stopper for controlling the movable range of the glove box 2 is removed, and the glove box 2 is opened wide, the rack 10 is controlled by the stopper 17 so as not to slip out of the gear-holding member 30 and the damper-holding member 60.

Incidentally, as another embodiment, it is possible to have a structure such that the locking portion is formed in the gear-holding member; the elastic piece is integrally molded with the damper-holding member; in place of the elastic piece, a soft material such as rubber or the like is sandwiched between the gear-holding member or the damper-holding member and the rack; an adhesive grease is coated; the stopper can be detachable relative to the rack; the rack inclines outward or inward relative to the gear-holding member; or in the contact portion, an area of the damper-holding-member contact portion is formed smaller than that of the gear-holding-member contact portion. Also, there may be provided a structure such that the damper-holding member 60 is supported by the glove box 2, and the rack 10 is supported by the support member 3.

Figure 13A:
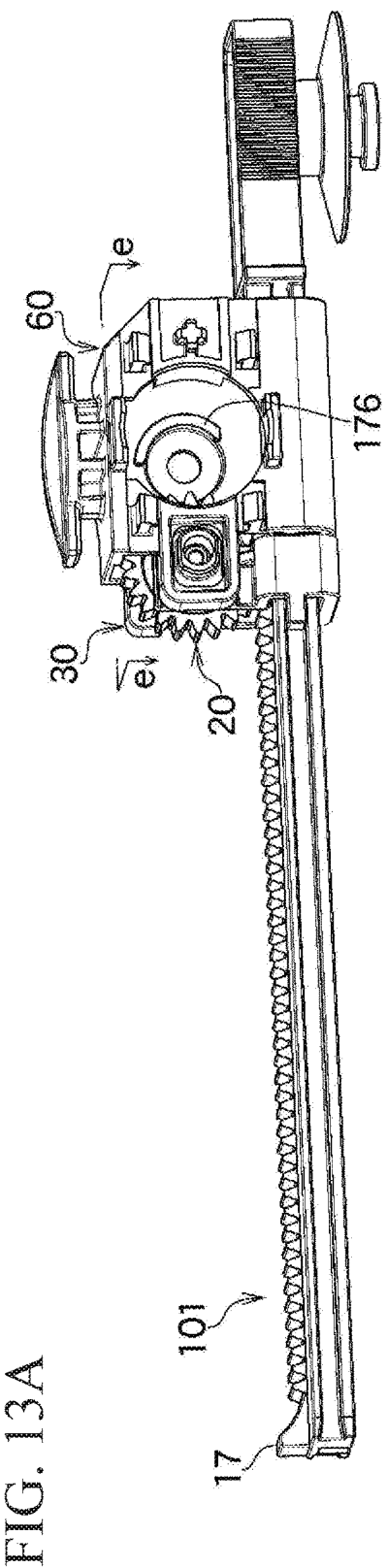
Figure 13B:
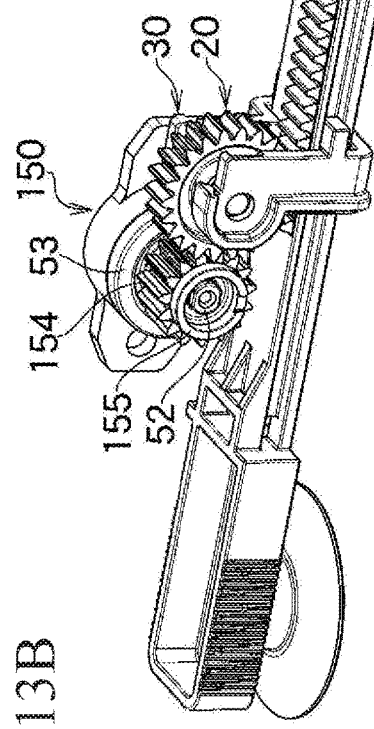
Figure 13C:
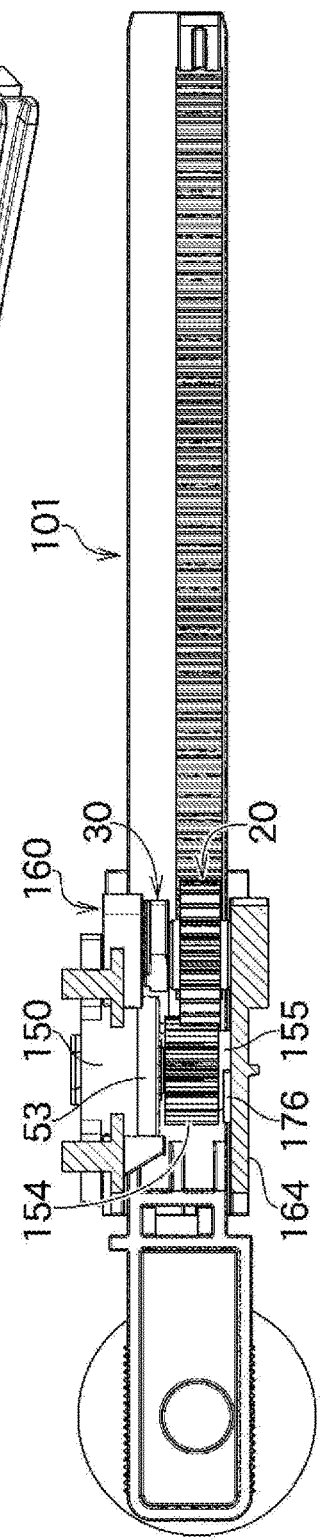
Figure 14A:
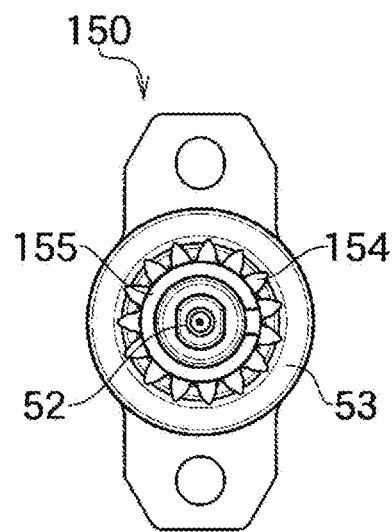
Figure 14B:
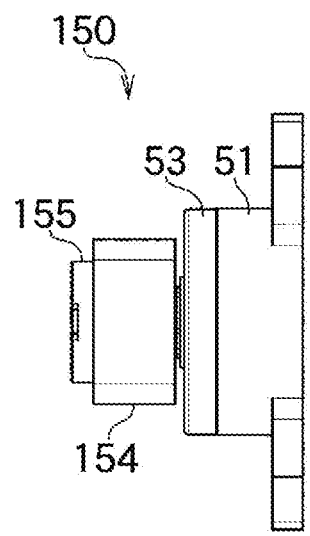
Figure 15A:
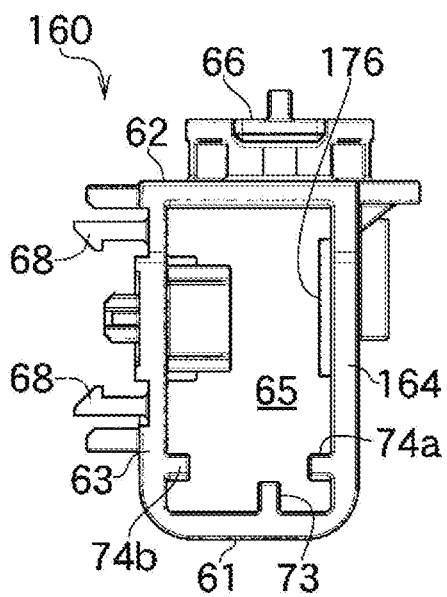
Figure 15B:
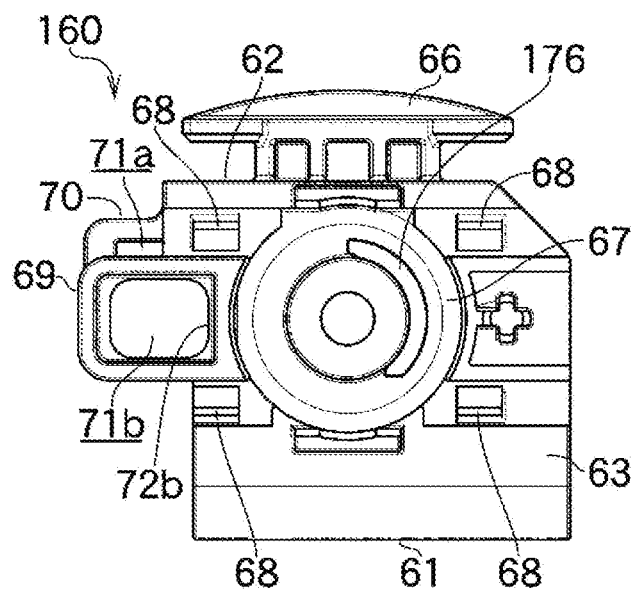

According to the aforementioned one-way damper mechanism 1, in the damper gear 54, only one side of a rotation shaft is supported by the rotor shaft portion 52, so that in the braking state, when an external force from the gear 20 acts on the damper gear 54, there is a possibility of a case wherein the damper gear 54 becomes decentered relative to the rotor shaft portion 52 and inclines. In that case, an engagement between the gear 20 and the damper gear 54 becomes inappropriate, so that there is a possibility of a case wherein abnormal noise occurs, or a case wherein the one-way damper mechanism 1 does not operate smoothly. Accordingly, the one-way damper mechanism according to a modified example of the present embodiment which solves the aforementioned problem will be explained based on the drawings. FIGS. 13(A), 13(B), and 13(C) show an external appearance of a one-way damper mechanism 101, and a cross section of essential parts. FIGS. 14(A) and 14(B) show a rotary damper 150 of the one-way damper mechanism 101, and FIGS. 15(A) and 15(B) show a damper-holding member 160 of the one-way damper mechanism 101. Incidentally, in the following, structures same as those in the one-way damper mechanism 1 are designated by the same reference symbols, explanations thereof are omitted, and only structures different from the one-way damper mechanism 1 will be explained.

As shown in FIGS. 13(A), 13(B), and 13(C), the one-way damper mechanism 101 differs from the one-way damper mechanism 1 with regard to a structure of a damper gear 154 of the rotary damper 150, and a structure of a damper-holding-member lower surface portion 164 of the damper-holding member 160. Specifically explained, as shown in FIGS. 14(A) and 14(B), in the damper gear 154, there is formed a gear rib 155. The gear rib 155 has approximately a "C" shape or an annular shape, is formed around a central axis of the damper gear 154, and projects in an axial direction. On the other hand, as shown in FIGS. 15(A) and 15(B), in the damper-holding-member lower surface portion 164, there is formed a holding-member rib 176. The holding-member rib 176 has an arc shape curved forward, faces the damper-housing hole 67 approximately on the same axis, and projects toward the damper-holding-member hole portion 65. Incidentally, the holding-member rib 176 may have approximately the "C" shape or the annular shape provided that a condition that the holding-member rib 176 does not interfere with the gear 20 is satisfied.

As shown in FIGS. 13(A) and 13(B), in a state wherein the one-way damper mechanism 101 is assembled, the gear rib 155 engages an inside of the holding-member rib 176.

In the aforementioned one-way damper mechanism 101, the damper gear 154 is supported by the rotor shaft portion 52, and engages the holding-member rib 176, so that the damper gear 154 is supported on both sides in the rotation shaft. According to the structure, in the braking state, when the gear 20 and the damper gear 154 engage, and the external force from the gear 20 acts on the damper gear 154, the damper gear 154 stably rotates. Therefore, an engagement between the gear 20 and the damper gear 154 becomes appropriate, and the one-way damper mechanism 101 operates smoothly without the abnormal noise.

Furthermore, as another modified example, provided that tooth surface portions of the damper gear, the gear, and the rack are a helical tooth (omitted in the drawings), an engagement between the tooth surface portions of the damper gear, the gear, and the rack becomes appropriate further so as to provide a further smooth operation with low noise.

Hereinabove, the embodiment of the present invention has been described in detail, however, the present invention is not limited to the embodiment described hereinabove, and the present invention can be variously modified provided that they do not exceed the subject within a range described in the invention.

EXPLANATION OF SYMBOLS 1 and 101 a one-way damper mechanism
2 a glove box
3 a support member
10 a rack
11 a rack-main member portion
12 a sliding surface portion
13 a tooth surface portion
14a, 14b, and 14c rack-rail portions
15 a rack-support main member portion
16 an oscillating-member support portion
17 a stopper
20 a gear
21 a gear-shaft portion
30 a gear-holding member
31 a gear-holding-member rail portion
32 a gear-holding-member inner surface portion
33 a gear-holding-member outer surface portion
34 a gear-holding-member upper surface portion
35 a gear-holding-member lower surface portion
36 a gear-holding-member hole portion
37a, 37b, and 37c gear-holding-member projecting portions
38 gear-support portions
39 a gear-holding-member upper facing portion
40 a gear-holding-member lower facing portion
41 a gear-holding-member contact portion (contact portion)
42 a foremost end portion
43 a flange portion
44 a notch portion
45 gear-support holes
46 a shaft-supporting projecting portion
47 an elastic piece (sliding resistance portion)
50 and 150 a rotary damper
51 a case
52 a rotor shaft portion
53 a case lid
54 and 154 a damper gear
60 and 160 a damper-holding member
61 a damper-holding-member inner surface portion
62 a damper-holding-member outer surface portion
63 a damper-holding-member upper surface portion
64 and 164 a damper-holding-member lower surface portion 65 a damper-holding-member hole portion
66 a support-member support portion
67 a damper-housing hole
68 damper-engagement pieces
69 a long-hole frame portion
70 a locking portion
71a and 71b movable areas
72a and 72b damper-holding-member contact portions (contact portion)
73 a damper-holding-member projecting portion
74a and 74b inclined projecting portions
75 an inclined groove portion
155 a gear rib
176 a holding-member rib
$\theta_1$ to $\theta_3$ angles
X and $X_1$ to $X_3$ pitches

What is claimed is:

1. A one-way damper mechanism, comprising:
 a rack;
 a gear-holding member provided with a gear engaging with the rack, and moving relatively to the rack; and
 a damper-holding member provided with a rotary damper, and arranged on the rack separately from the gear-holding member, the damper-holding member moving relatively to the rack and relatively to the gear-holding member so that the gear is engaged with the rotary damper or separated from the rotary damper,
 wherein the one-way damper mechanism changes between a braking state where the gear and the rotary damper are engaged, and a release state where the gear and the rotary damper are separated.

2. A one-way damper mechanism according to claim 1, wherein one of either the gear-holding member or the damper-holding member includes a locking portion allowing the other of either the gear-holding member or the damper-holding member to follow in the release state.

3. A one-way damper mechanism according to claim 1, wherein a sliding resistance portion is provided between one of either the gear-holding member or the damper-holding member and the rack.

4. A one-way damper mechanism according to claim 3, wherein the sliding resistance portion is an elastic piece integrally molded with one of either the gear-holding member or the damper-holding member.

5. A one-way damper mechanism according to claim 1, wherein the rack inclines to a side engaging with the gear or a side opposite to the side engaging with the gear relative to the gear-holding member or the damper-holding member.

6. A one-way damper mechanism according to claim 1, wherein in a contact portion between the gear-holding member and the damper-holding member in the braking state, one of either the gear-holding member or the damper-holding member is formed smaller than another of either the gear-holding member or the damper-holding member.

7. A one-way damper mechanism according to claim 1, wherein the rack is supported by an oscillating member, and one of either the gear-holding member or the damper-holding member is supported by a support member for supporting and housing the oscillating member.

8. A one-way damper mechanism according to claim 1, further comprising:
 a sliding resistance portion provided at the gear-holding member so that in the braking state, the gear holding member slides along with a movement of the rack to thereby engage the gear on the gear holding member with the rotary damper.

9. A one-way damper mechanism according to claim 8, further comprising:
 a locking portion provided on one of the gear-holding member or the damper-holding member for allowing the other of the gear-holding member or the damper-holding member to follow in a range limited by the locking portion.

10. A one-way damper mechanism according to claim 9, wherein the rack is arranged such that when the rack is moved in one direction, the gear on the gear holding member engages the rotary damper and the gear holding member slides on the rack while the gear engages the rotary damper.

11. A one-way damper mechanism according to claim 10, wherein the rack is arranged such that when the rack is moved in a direction opposite to the one direction, the gear holding member on the rack slides so that the gear is separated from the rotary damper.

* * * * *